(12) United States Patent
Shibano

(10) Patent No.: US 8,395,859 B2
(45) Date of Patent: Mar. 12, 2013

(54) METHOD OF DETECTING TOUCHDOWN OF MAGNETIC HEAD USING TIMESTAMPS, AND MAGNETIC DISK DRIVE TO WHICH THE METHOD IS APPLIED

(75) Inventor: Motomichi Shibano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/179,410

(22) Filed: Jul. 8, 2011

(65) Prior Publication Data

US 2012/0105998 A1 May 3, 2012

(30) Foreign Application Priority Data

Oct. 29, 2010 (JP) ................................ 2010-244305

(51) Int. Cl.
*G11B 21/02* (2006.01)
*G11B 27/36* (2006.01)
*G11B 15/46* (2006.01)

(52) U.S. Cl. ........................... 360/75; 360/31; 360/73.03

(58) Field of Classification Search ........................ None
See application file for complete search history.

(56) References Cited

U.S. PATENT DOCUMENTS

| 7,050,258 B1 * | 5/2006 | Codilian | .................... 360/73.03 |
| 7,508,618 B1 | 3/2009 | Herbst et al. | |
| 2009/0128947 A1 * | 5/2009 | Kermiche et al. | ............... 360/75 |

FOREIGN PATENT DOCUMENTS

| JP | 2000-195211 | 7/2000 |
| JP | 2000-251430 | 9/2000 |
| JP | 2001-110156 | 4/2001 |
| JP | 2001-176181 | 6/2001 |
| JP | 2001-291218 | 10/2001 |
| JP | 2007-184017 | 7/2007 |
| JP | 2010-080028 | 4/2010 |

OTHER PUBLICATIONS

Japanese Office Action dated Nov. 25, 2011, filed in Japanese counterpart Application No. 2010-244305, 4 pages (with English translation).

* cited by examiner

*Primary Examiner* — Andrew L Sniezek
(74) *Attorney, Agent, or Firm* — Patterson & Sheridan, LLP

(57) ABSTRACT

According to one embodiment, a method of detecting contact of a magnetic head with a magnetic disk by changing the dynamic flying height of the magnetic head in a magnetic disk drive is disclosed. The method can change control of a spindle motor configured to rotate the magnetic disk, from feedback control to open loop control. The method can detect a change in rotational speed of the magnetic disk during the open loop control. The method can detect contact of the magnetic head with the magnetic disk based on the detected change in the rotational speed.

8 Claims, 10 Drawing Sheets

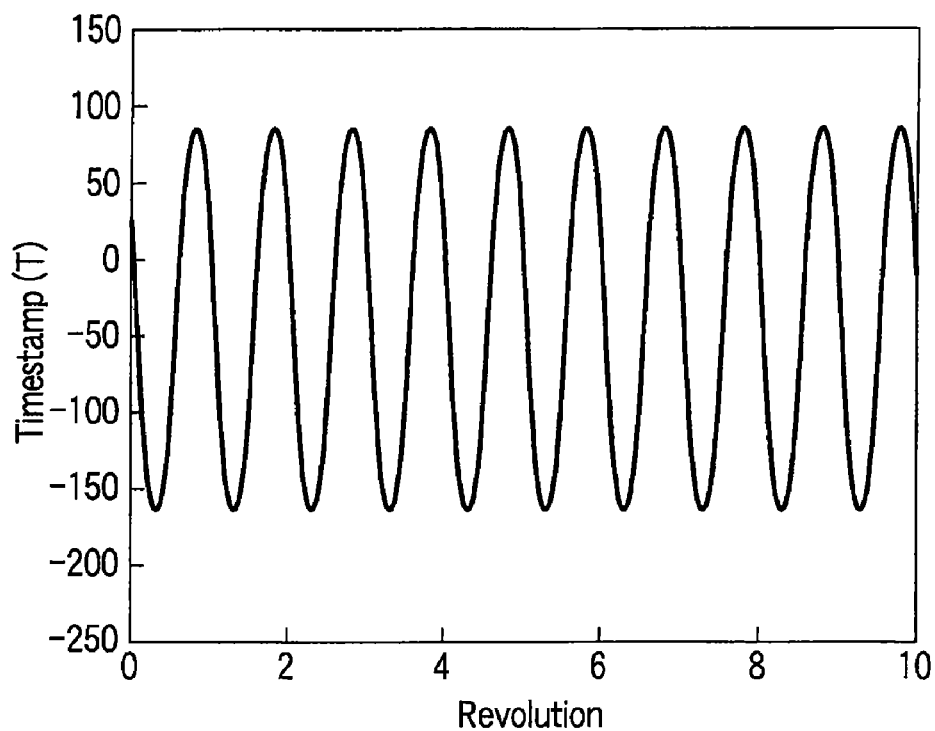
F I G. 4A
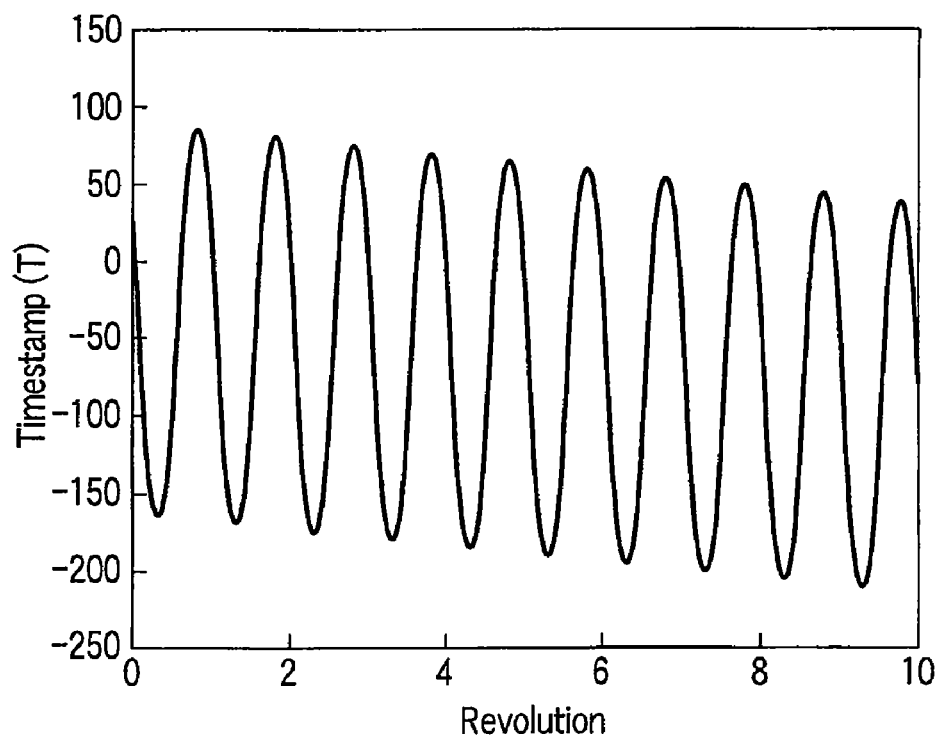
F I G. 4B

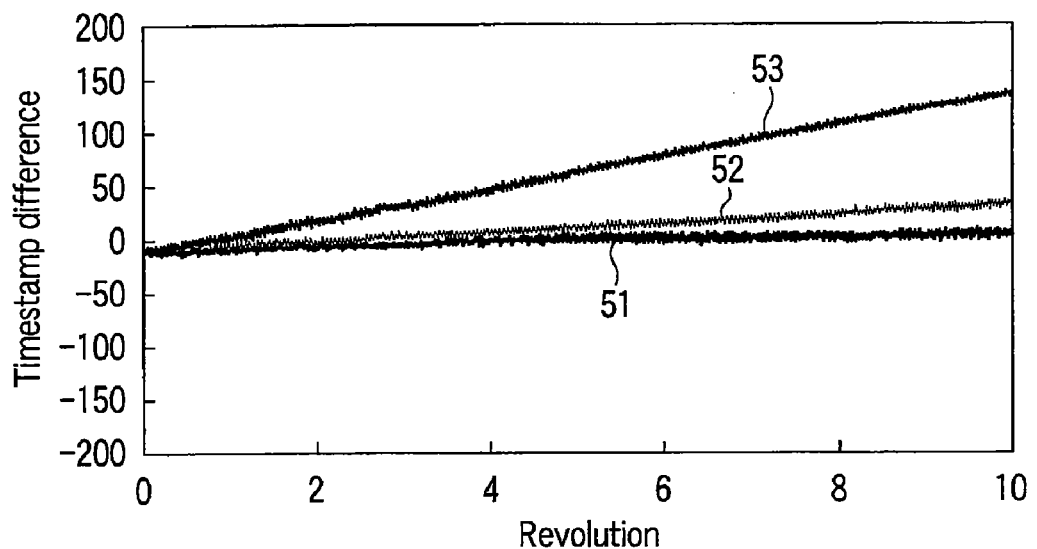
F I G. 5
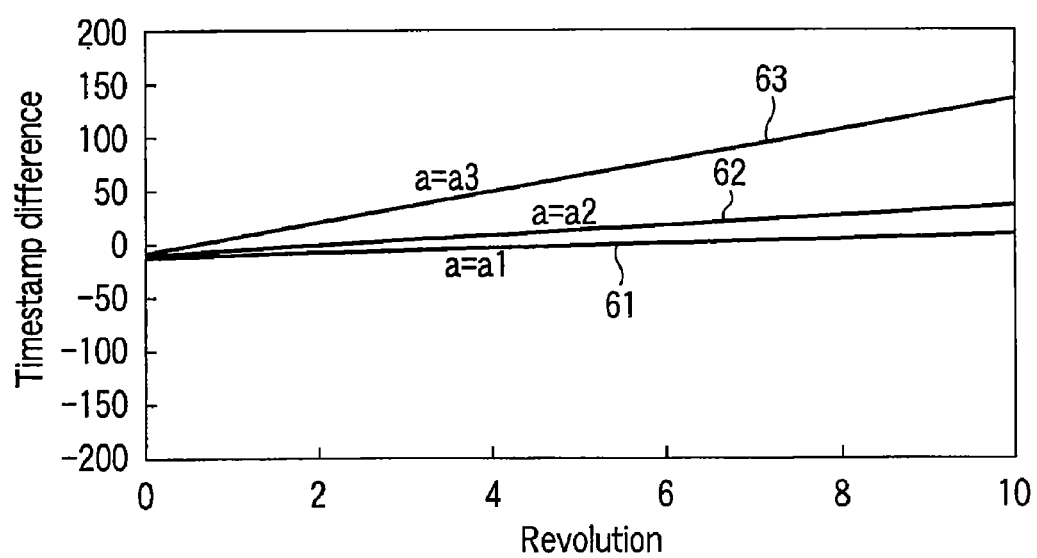
F I G. 6

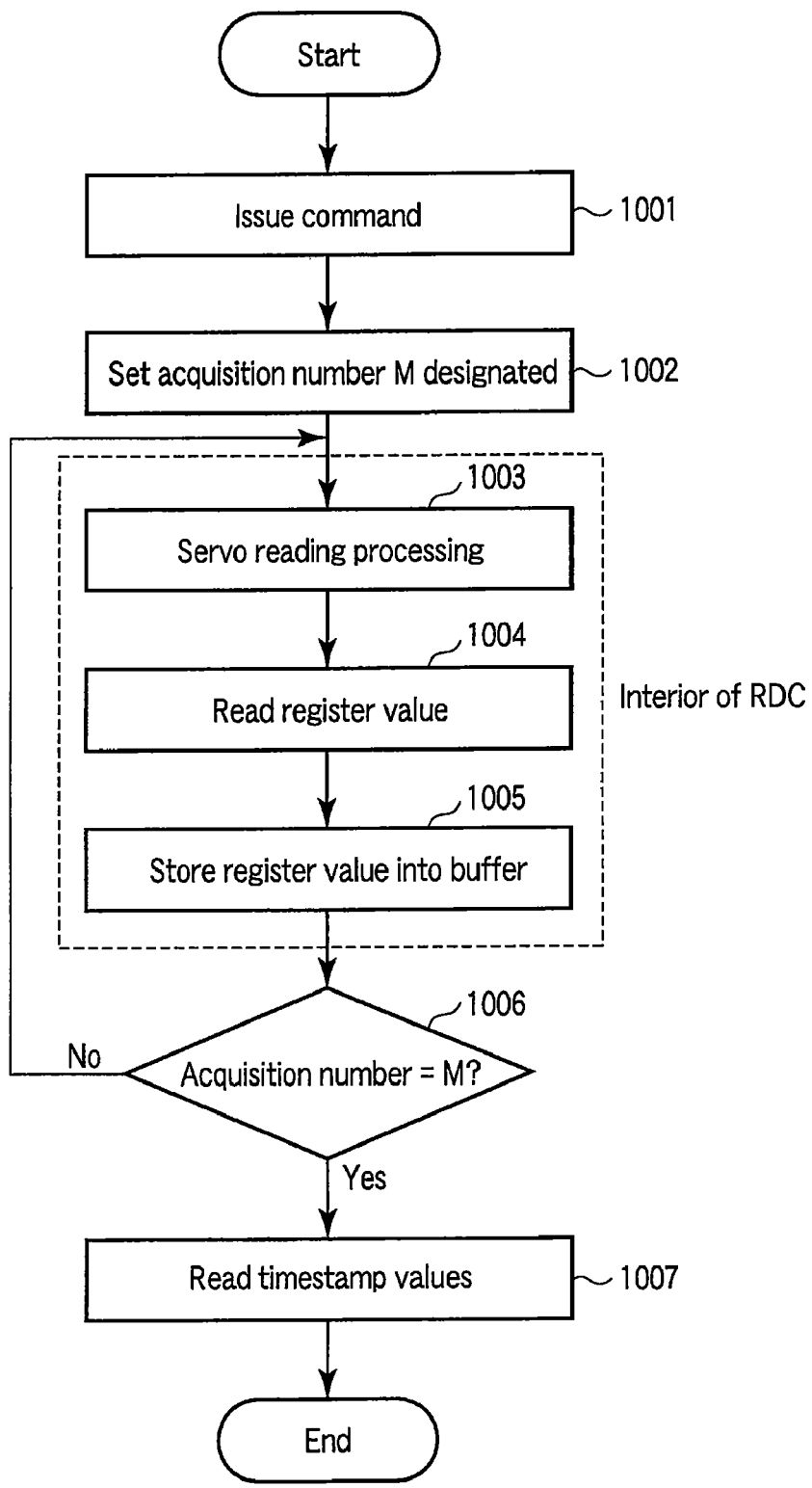
F I G. 10

METHOD OF DETECTING TOUCHDOWN OF MAGNETIC HEAD USING TIMESTAMPS, AND MAGNETIC DISK DRIVE TO WHICH THE METHOD IS APPLIED

CROSS-REFERENCE TO RELATED APPLICATIONS

This application is based upon and claims the benefit of priority from Japanese Patent Application No. 2010-244305, filed Oct. 29, 2010; the entire contents of which are incorporated herein by reference.

FIELD

Embodiments described herein relate generally to a method of detecting touchdown of a magnetic head using timestamps, and a magnetic disk drive to which the method is applied.

BACKGROUND

In recent magnetic disk drives, in accordance with increases in magnetic recording density, there is a tendency for the circumferential length of a mark recorded on a magnetic recording medium (namely, a magnetic disk) to become shorter, and for the radial width of a track on the magnetic disk to become narrower. Accordingly, to enhance the quality of read/write signals, it is necessary to narrow the distance (more specifically, magnetic spacing) between the magnetic disk and a magnetic head.

In light of the above, in the recent magnetic disk drives, the magnetic head has a heating element for adjusting the distance between the magnetic head and the magnetic disk (more specifically, the distance between the read/write element of the magnetic head and the magnetic disk) by thermal expansion of the magnetic head. In other words, in the recent magnetic disk drives, the dynamic flying height of the magnetic head flying over the magnetic disk can be adjusted.

The dynamic flying height of the magnetic head can be easily controlled by power called dynamic flying height power (hereinafter referred to as "the DFH power") supplied to the heating element. However, unless the state (touchdown state) in which the magnetic head touches the magnetic disk is detected, it is difficult to execute accurate flying height control.

In the prior art, the touchdown (TD) of the magnetic head is detected based on, for example, a track position error signal (PES), as follows: Firstly, when tracking control is executed with the magnetic head kept flying normally, the PES has a preset value. A change in the PES indicates the accuracy of positioning. When the flying height of the magnetic head is reduced to cause the magnetic head to touch the magnetic disk, vibration due to the touch occurs in the magnetic head radially with respect to the magnetic disk. At this time, an abnormal change in the PES can be observed. Utilizing this phenomenon, the touchdown of the magnetic head can be detected.

Further, when the magnetic head touches the magnetic disk, a vibration component is observed along the normal line of the magnetic disk. This state appears as a variation in the amplitude of a read signal. In the case of, for example, a servo signal or a data signal, a change in the read signal can be detected as the value of a variable gain amplifier (VGA) incorporated in a read channel (RDC).

The phenomenon in which the magnetic head vibrates due to touchdown generally depends upon the radial position on the magnetic disk. At the inner and outer circumferential portions of the magnetic disk, vibration of a greater magnitude appears in the magnetic head due to touchdown, whereas at the (radially) middle portion of the disk, vibration of a smaller magnitude occurs in the magnetic head. This is because at the middle portion, the contact friction force of the magnetic head is influenced by a skew angle to thereby produce a vibration force exerted therein radially with respect to the disk. As a result, it is easy to detect touchdown at the inner and outer circumferential portions of the disk, while it is difficult to detect the same at the middle portion since the signal level is low. Furthermore, measured values for detecting touchdown vary because of the influence of warpage of the magnetic disk or because of the lubricant agent on the disk.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4A is a diagram showing an example of a curve representing a timestamp change observed when the dynamic flying height of the magnetic head is not set lower;

FIG. 4B is a diagram showing an example of a curve representing a timestamp change observed when the dynamic flying height of the magnetic head is set lower;

FIG. 5 is a diagram showing examples of curves representing timestamp differences observed when the magnetic head and the magnetic disk contact each other differently;

FIG. 6 is a diagram showing straight lines each approximating the corresponding curve for a timestamp difference shown in FIG. 5, in association with the gradients of the straight lines;

FIG. 10 is a flowchart illustrating an exemplary procedure for timestamp measurement used in the embodiment;

DETAILED DESCRIPTION

Various embodiments will be described hereinafter with reference to the accompanying drawings. In general, according to one embodiment, a method of detecting contact of a magnetic head with a magnetic disk by changing the dynamic flying height of the magnetic head in a magnetic disk drive is disclosed. The method can change control of a spindle motor configured to rotate the magnetic disk, from feedback control to open loop control. The method can detect a change in rotational speed of the magnetic disk during the open loop control. The method can detect contact of the magnetic head with the magnetic disk based on the detected change in the rotational speed.

Firstly, a description will be given of the principle of the mechanism of detecting the touchdown of a magnetic head, employed in the embodiment.

(1) A magnetic disk drive according to the embodiment has a function of detecting the touchdown of a magnetic head on a magnetic disk by varying the dynamic flying height of the magnetic head, and setting the flying height of the magnetic head based on the detection result. The first feature of the embodiment lies in that in the above magnetic disk drive, the touchdown of the magnetic head is detected by detecting a change in the rotational speed of the magnetic disk.

Figure 1:
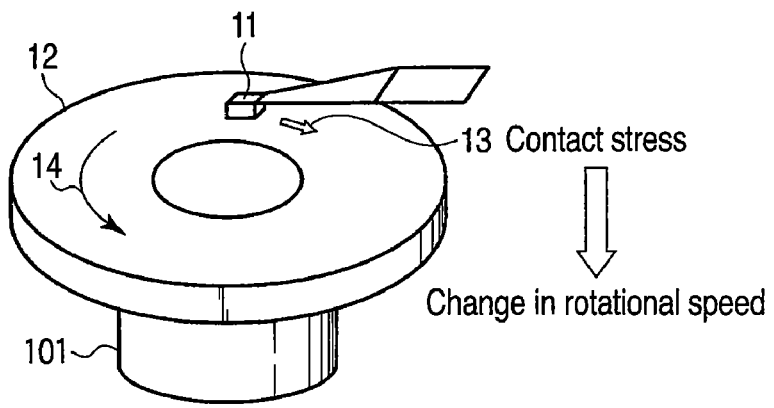
FIG. 1 is a diagram illustrating an exemplary basic principle for detecting touchdown of a magnetic head according to an embodiment.

Referring now to FIG. 1, the relationship between the touchdown (contact) of the magnetic head and a change in the rotational speed of the magnetic disk will be described. As shown in FIG. 1, when a magnetic head 11 contacts a magnetic disk 12 rotating in the direction indicated by arrow 14, contact stress occurs in the magnetic disk 12, and a contact frictional force 13 corresponding to the stress is exerted on the magnetic head 11. When the contact frictional force 13 is exerted on the magnetic head 11, radial and tangential vibrations of the magnetic disk 12 are exerted on the magnetic head 11. Namely, the contact of the magnetic head 11 to the magnetic disk 12 can be observed as the vibration of the magnetic head 11.

The contact frictional force 13 also adversely affects the magnetic disk 12 to reduce the rotational speed of the magnetic disk 12. In consideration of this, the embodiment employs a method of easily detecting the contact of the magnetic head 11 simply by detecting a change in the rotational speed of the magnetic disk 12.

(2) A second feature of the embodiment is that a change in the rotational speed of the magnetic disk 12 is detected with open loop control applied to the control of the spindle motor (SPM) 101. The reason for the application of the open loop control will be explained. The magnetic disk 12 is rotated by SPM 101. SPM 101 is subjected to feedback control by a hard disk controller (HDC) 212 (see FIG. 8). That is, the HDC 212 performs the feedback control on SPM 101 so that SPM 101 rotates at a predetermined rotational speed. Thus, even if the rotational speed of SPM 101 changes, SPM 101 is controlled such that the rotational speed of SPM 101 constantly recovers to the predetermined value. Specifically, a current supplied to SPM 101 is increased in order to cancel the contact stress applied to the magnetic head 11 as a result of the contact of the magnetic head 11 with the magnetic disk 12. Thus, the rotary torque of SPM 101 increases to correct the rotational speed of SPM 101 to the predetermined value.

Figure 2A:
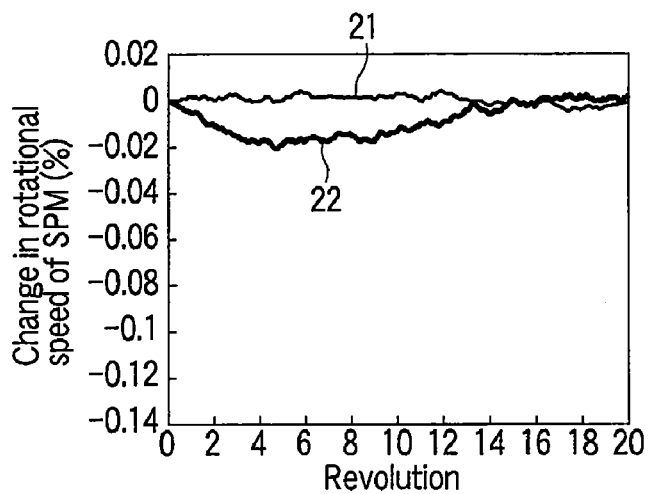
FIG. 2A is a diagram showing examples of changes in the rotational speed of a spindle motor observed when the magnetic head is in contact with a magnetic disk and when the magnetic head is out of contact with the magnetic disk, with the spindle motor subjected to feedback control.

FIG. 2A illustrates examples of changes in rotational speed observed while the magnetic disk 12 is making a predetermined number of revolutions when SPM 101 is subjected to the feedback control as described above. Here, the given number of revolutions is 20. In FIG. 2A, a curve 21 represents a change in rotational speed observed when the magnetic head 11 is not in contact with the magnetic disk 12 (the dynamic flying height of the magnetic head 11 is not set lower). A curve 22 represents a change in rotational speed observed when the magnetic head 11 is in contact with the magnetic disk 12 (the dynamic flying height of the magnetic head 11 is set lower). As is apparent from the curve 22, even when the magnetic head 11 comes into contact with the magnetic disk 12 to change the rotational speed of the magnetic disk 12, the feedback control works to correct the rotational speed to the original value.

Figure 2B:
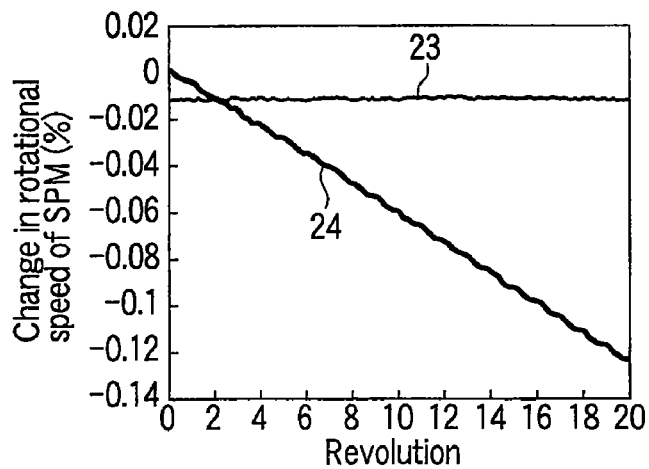
FIG. 2B is a diagram showing examples of changes in the rotational speed of the spindle motor observed when the magnetic head is in contact with the magnetic disk and when the magnetic head is out of contact with the magnetic disk, with the spindle motor subjected to open loop control.

FIG. 2B shows examples of changes in rotational speed observed while the magnetic disk 12 is making a predetermined number of revolutions (in this case, 20 revolutions) of the magnetic disk 12 when SPM 101 is subjected to the open loop control instead of the feedback control. In FIG. 2B, a curve 23 represents a change in rotational speed observed when the magnetic head 11 is not in contact with the magnetic disk 12. A curve 24 represents a change in rotational speed observed when the magnetic head 11 is in contact with the magnetic disk 12.

As is well known, in the open loop control, a fixed current is constantly supplied to SPM 101, and even if the rotational speed of SPM 101 changes, the changed rotational speed is not corrected. Therefore, even when the magnetic head 11 comes into contact with the magnetic disk 12 to change the rotational speed of the magnetic disk 12, the rotational speed is not corrected to the original value. That is, when the magnetic head 11 comes into contact with the magnetic disk 12 to generate a contact stress 13, the number of revolutions of the magnetic disk 12 increases to reduce the rotational speed of the magnetic disk 12.

Thus, as is apparent from the curve 24, the rate of change in the rotational speed of the magnetic disk 12 (more specifically, the absolute value of the rate of change in rotational speed) increases consistently with the number of revolutions of the magnetic disk 12. Hence, a change in rotational speed can be more clearly detected by applying the open loop control instead of the feedback control while a change in the rotational speed of the magnetic disk 12 is being detected.

(3) The third feature of the embodiment lies in that the time interval between adjacent servo areas 31 (see FIG. 3A) discretely provided on the magnetic disk 12, i.e., a so-called timestamp (see FIGS. 3B and 3C), is utilized to detect a change in the rotational speed of the magnetic disk 12. The time interval (i.e., the servo time interval) between the adjacent servo areas 31 indicates the time interval required for each servo area 31 to pass the position of the magnetic head 11 shown in FIG. 1 in accordance with the rotation of the magnetic disk 12. By measuring the servo time interval, a change in the rotational speed of the magnetic disk 12 can be easily detected. As will be described later, the servo time interval can be measured as the interval of the times of detecting servo patterns (more specifically, servo synchronization marks) recorded on the servo areas 31.

Recent read channels generally have a function of measuring the servo time interval. This function is prepared to optimize the write frequency for write operation. By this function, a change in the servo time interval is monitored. Therefore, when the magnetic head follows a trajectory eccentric with respect to the servo pattern recorded on the magnetic disk, a change in the servo time interval can be accurately detected. This enables a change in servo acquisition frequency to be predicted beforehand to thereby stabilize the servo control operation. In the embodiment, by diverting the above-mentioned function of the read channels, a change in the rotational speed of the magnetic disk 12 shown in FIG. 1 can be accurately detected.

Figure 3A:
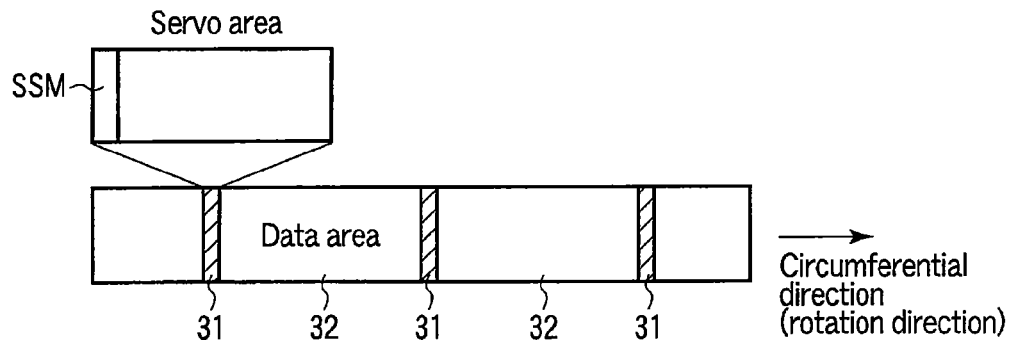
FIG. 3A is a diagram showing an example of arrangement of servo areas on the magnetic disk.
Figure 3B:
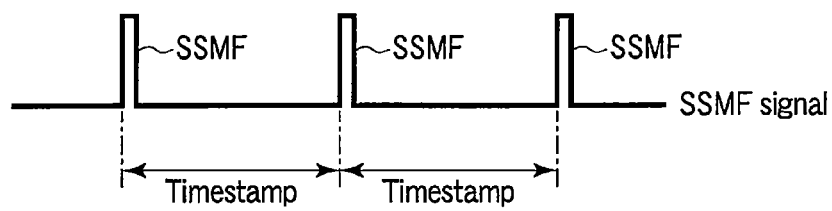
FIG. 3B is a diagram showing an example of servo time intervals (timestamps)
Figure 3C:
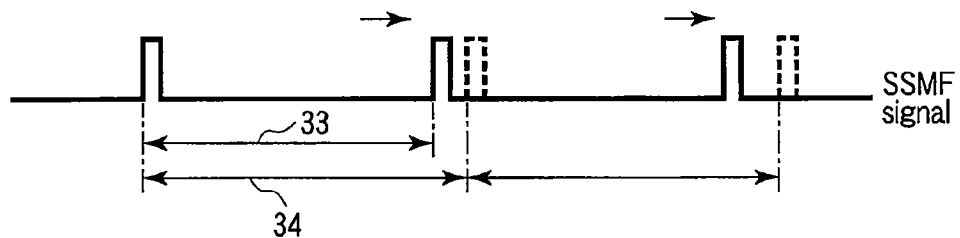
FIG. 3C is a diagram illustrating the relationship between a change in the rotational speed of the magnetic disk and a timestamp change.

Referring then to FIGS. 3A, 3B and 3C, a description will be given of an example of a relationship between a change in the rotational speed of the magnetic disk and a change in the servo time interval (timestamp). As shown in FIG. 3A, the servo areas 31 on which servo patterns are recorded are circumferentially discretely provided on the magnetic disk 12 shown in FIG. 1. Data areas 32 are provided between the adjacent servo areas 31. Servo synchronization marks (SSM) as information for identifying the respective servo areas 31 are recorded on predetermined portions, e.g., the leading portions, of the servo areas 31.

When the magnetic head 11 shown in FIG. 1 contacts the magnetic disk 12 to cause the contact frictional force 13 therebetween, a change in the rotational speed of the magnetic disk 12 appears as a change in the time interval (servo time interval) between the adjacent servo areas 31. More specifically, the change in the rotational speed of the magnetic disk 12 appears as a change in the time interval (timestamp) between the times SSMF at which the servo synchronization marks (SSM) are detected (founded), as is shown in FIGS. 3B and 3C. Thus, the change in the rotational speed of the magnetic disk 12 is detected numerically as a timestamp change representing changes in measured timestamps. In particular, FIG. 3C shows a case where the contact frictional force 13 reduces the rotational speed of the magnetic disk 12, with the result that a timestamp 33 has changed to a timestamp 34 higher than the former.

(4) The fourth feature of the embodiment lies in that the following method of measuring (detecting) a timestamp difference is employed in order to enhance the measurement (detection) accuracy of the timestamp change. In the embodiment, in timestamp difference measurement, the timestamps detected when the magnetic head 11 and the magnetic disk 12 shown in FIG. 1 are out of contact with each other are used as reference values. In contrast, the timestamps detected when the magnetic head 11 and the magnetic disk 12 are in contact with each other are used as estimated values.

In the embodiment, over the period of acquiring the timestamps, the difference between the reference value and the estimated value is measured (calculated) as a timestamp difference at every SSMF at which the same servo area 21 is detected. As a result, a timestamp difference change representing changes in the timestamp differences is measured. Based on the timestamp difference change, contact between the magnetic head 11 and the magnetic disk 12 can be accurately detected.

Referring to FIGS. 4A and 4B, the timestamp difference change will be described. In the embodiment, assume that the timestamps are acquired (detected) only in a predetermined period, e.g., a period in which the magnetic disk 12 makes a predetermined number of revolutions (10 revolutions in the embodiment). Namely, in the embodiment, the timestamps detected in the period, in which the magnetic head 11 and the magnetic disk 12 are in a non-touchdown state (non-TD state) where they are out of contact with each other, and in which the magnetic disk 12 makes 10 revolutions, are acquired as reference values.

Subsequently, DFH power supplied to the aforementioned heating element is gradually increased. As a result, the dynamic flying height of the magnetic head 11 is gradually reduced. Whenever the DFH power is increased, the timestamps detected in the period, in which the magnetic disk 12 makes 10 revolutions, are acquired as estimated values.

FIG. 4A shows an example of a curve representing changes in timestamps (reference values) observed while the number of revolutions of the magnetic disk 11 is between 0 and 10 in the non-touchdown state (non-TD state) where the magnetic head 11 is out of contact with the magnetic disk 12 because the dynamic flying height of the magnetic head 11 is not set lower. FIG. 4B shows an example of a curve representing changes in timestamps (estimated values) observed while the number of revolutions of the magnetic disk 11 is between 0 and 10 in the touchdown state (TD state) where the magnetic head 11 is in contact with the magnetic disk 12 as a result of a reduction in the dynamic flying height of the magnetic head 11. In FIGS. 4A and 4B, the timestamps are normalized such that the timestamp is 0 when the change in timestamp is 0.

Servo areas 31 on the magnetic disk 12 in which servo patterns are recorded are not positioned concentrically with the magnetic head 11 but are eccentric with respect to the magnetic head 11. This is because the position of the center of rotation of the magnetic disk 12 varies between a servo track writer configured to discretely record the servo patterns on the magnetic disk 12 and a magnetic disk drive in which the magnetic disk 12 with the servo patterns recorded therein is mounted.

Consequently, the circumferential speed varies among the servo patterns (servo areas 31) depending on the eccentric positioning. Thus, the timestamp (reference value) acquired in the non-touchdown state (non-TD state) varies almost periodically as shown in FIG. 4A. On the other hand, the timestamp (estimated value) acquired in the touchdown state (TD state) varies almost periodically as shown in FIG. 4B, and furthermore a change in timestamp (timestamp change) increases consistently with the number of revolutions under the effect of the contact stress 13 shown in FIG. 1.

In the embodiment, the difference between such a reference value as shown in FIG. 4A and such an estimated value as shown in FIG. 4B at every SSMF for the same servo area 31 is calculated (the difference is hereinafter referred to as the timestamp difference). Then, based on the timestamp difference, a timestamp change, that is, a change in the rotation speed of the magnetic disk 12 is detected.

The following effects are exerted by detection of a change in the rotational speed of the magnetic disk 12 based on the timestamp difference. For example, if a periodical change in the rotation of the magnetic disk 12 results from such eccentricity as described above, the change in the rotation appears as changes in timestamps. Thus, in the embodiment, during the period of the above-described number of revolutions (10 revolutions), timestamps are acquired as reference values with the dynamic flying height of the magnetic head 11 unchanged (with the dynamic flying height not set lower). Similarly, during the period of the above-described number of revolutions (10 revolutions), as many timestamps as the reference values acquired are acquired as estimated values with the dynamic flying height of the magnetic head 11 changed (with the dynamic flying height set lower). Thus, the differences between the reference values acquired and the estimated values acquired are calculated to be timestamp differences. This difference calculation serves to cancel periodical rotational change components. The timestamp differences acquired by the difference calculation clearly indicate a timestamp change resulting from the reduction in the dynamic flying height of the magnetic head 11 (the reduction occurs, for example, when the magnetic head 11 comes into contact with the magnetic disk 12). Hence, detection accuracy can be increased by detecting a change in the rotational speed of the magnetic disk 12 based on such timestamp differences as described above.

FIG. 5 shows three examples of the timestamp differences during the period of the above-described number of revolutions (10 revolutions). A curve 51 represents changes in the timestamp differences with respect to the number of revolutions observed when estimated values are acquired with the magnetic head 11 out of contact with the magnetic disk 12. A curve 52 represents changes in the timestamp differences with respect to the number of revolutions observed when estimated values are acquired with the magnetic head 11 in slight contact with the magnetic disk 12. A curve 53 represents changes in the timestamp differences with respect to the number of revolutions observed when estimated values are acquired with the magnetic head 11 in tight contact with the magnetic disk 12. Here, it should be noted that the curves 51, 52, and 53 are almost straight and that the gradient of each of the curves 51, 52, and 53 increases consistently with the tightness of the contact of the magnetic head 11 with the magnetic disk 12.

(5) A fifth feature of the embodiment is that a linear approximate equation y=ax+b is acquired which indicates changes in timestamp differences y with respect to the number x of revolutions so that touchdown is detected (determined) based on the approximate equation y=ax+b. As described above, in the embodiment, the timestamp differences y acquired are the differences between the reference values acquired with the dynamic flying height of the magnetic head 11 not set lower and the estimated values acquired with the dynamic flying height of the magnetic head 11 set lower. Thus, changes in the timestamp differences y with respect to the number x of revolutions are plotted, and a curve representing the changes is approximated by a straight line. Hence, the corresponding linear approximate equation, that is, the linear approximate equation y=ax+b, is acquired. Then, the gradient "a" of the straight line approximating the curve is acquired from the linear approximate equation y=ax+b acquired. The gradient "a" indicates a timestamp change. Thus, the gradient "a" is hereinafter referred to as the timestamp gradient "a".

FIG. 6 shows straight lines 61 to 63 approximating the curves 51 to 53 shown in FIG. 5, in association with the gradients a1 to a3 of the straight lines 61 to 63. In the embodiment, with DFH power varied to gradually reduce the dynamic flying height of the magnetic head 11, the gradients of the straight lines 61 to 63 are acquired at each dynamic flying height. Thus, timestamp gradients are acquired. Plotting of the timestamp gradients acquired at dynamic flying heights indicates that the timestamp gradient changes rapidly when the magnetic head 11 touches down on the magnetic disk 12.

Figure 7:
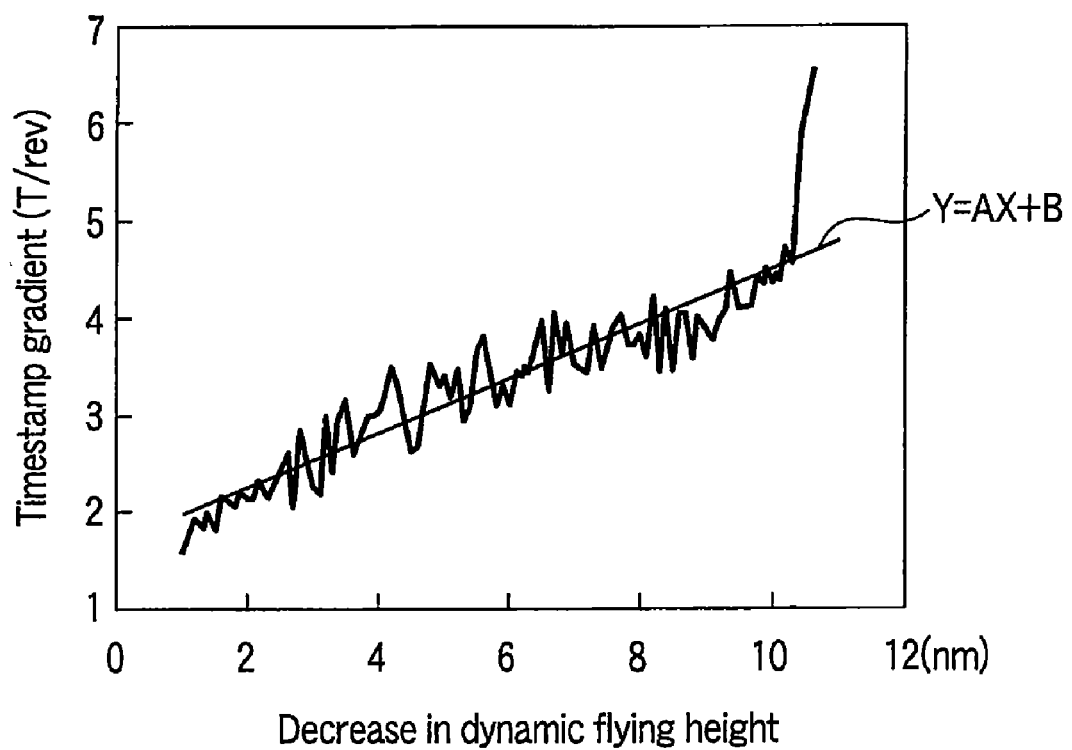
FIG. 7 is a diagram showing an example of a curve representing a change in timestamp gradient observed when the dynamic flying height of the magnetic head is gradually reduced.

FIG. 7 shows an example of a change in timestamp gradient observed when the dynamic flying height of the magnetic head 11 is gradually reduced. In FIG. 7, the axis of abscissas represents the amount of decrease in dynamic flying height. The axis of ordinate represents the timestamp gradient. The amount of decrease in dynamic flying height is based on the dynamic flying height obtained when no DFH power is applied to the above-described heating element, and increases consistently with the DFH power.

A gradual decrease in dynamic flying height gradually reduces the rotational speed of the magnetic disk 12. Thus, as is apparent from FIG. 7, the timestamp gradient tends to increase consistently with the amount of decrease in dynamic flying height (with the DFH power). Furthermore, the timestamp gradient varies under the adverse effect of a variation in timestamp measurement.

When the magnetic head 11 comes into contact with the magnetic disk 12 as a result of the dynamic flying height exceeding a certain value, the timestamp gradient changes rapidly as is apparent from FIG. 7. Hence, detection of the rapid change is important for detecting touchdown. Thus, the HDC 212 acquires the linear approximate equation Y=AX+B indicating a change in timestamp gradient Y with respect to the amount X of decrease in dynamic flying height before the rapid increase in timestamp gradient.

The HDC 212 determines that the magnetic head 11 has touched down on the magnetic disk 12 when the deviation of a first timestamp gradient Y=Y1 from a second timestamp gradient exceeds a predetermined value. The first timestamp gradient corresponds to the amount X=X1 of decrease in dynamic flying height. The second timestamp gradient is estimated from the linear approximate equation Y=AX+B (the second timestamp gradient corresponds to the average value of the timestamp gradients).

In the above description, the amount of decrease in dynamic flying height is used as X for easier understanding. However, measurement of the amount of decrease in dynamic flying height is not easy. On the other hand, the amount of decrease in dynamic flying height is almost proportional to the DFH power (more specifically, to a control value designating the DFH power, that is, a DFH power control value). Thus, in the embodiment, for simplification of processing, the DFH power (DFH power control value) is used as X instead of the amount of decrease in dynamic flying height.

Figure 8:
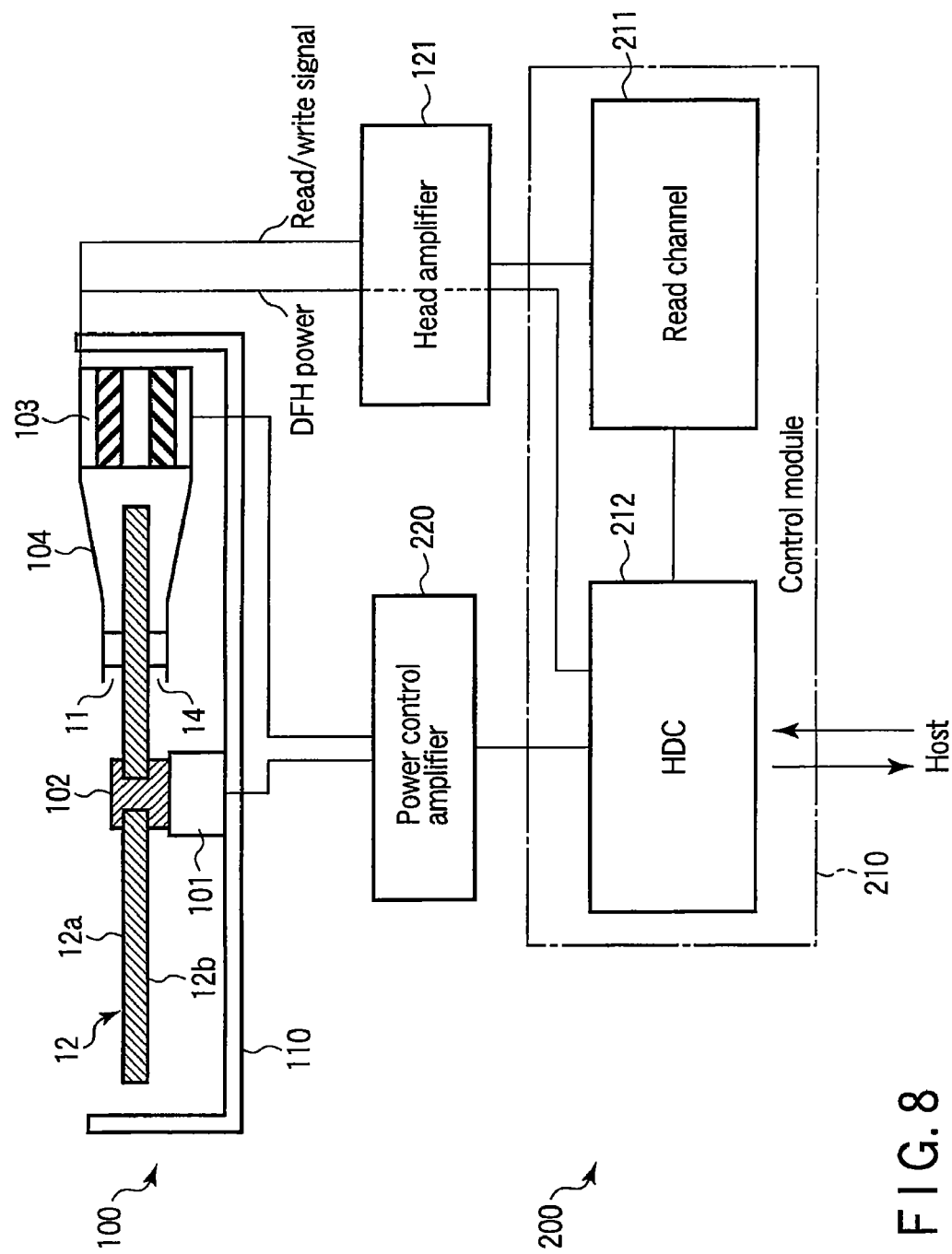
FIG. 8 is a diagram showing an exemplary configuration of a magnetic disk drive according to the embodiment.

The embodiment, to which the above-mentioned principle is applied, will be described in detail. FIG. 8 shows the structure of the magnetic disk drive of the embodiment. In FIG. 8, elements equivalent to those of FIG. 1 are denoted by corresponding reference numbers, and no detailed description will be given thereof. The magnetic disk drive shown in FIG. 8 mainly comprises a head disk assembly unit (HDA unit) 100, and a printed circuit board unit (PCB unit) 200.

The HDA unit 100 comprises a spindle motor (SPM) 101, a hub 102 and a voice coil motor (VCM) driving mechanism 103, as well as the magnetic head 11 and the magnetic disk 12. The HDA unit 100 is incorporated in, for example, a rectangular aluminum housing 110 with an upper opening. The upper opening of the housing 110 is covered with a shield member and a top plate, which are not shown, so that the HDA unit 100 is isolated from the external air.

In the HDA unit 100, the magnetic disk 12 is attached to the SPM 101 via the hub 102 and is rotated at a predetermined rotational speed (e.g., 5400 rpm). The surfaces 12a and 12b of the magnetic disk 12 serve as recording surfaces on which data is magnetically recorded. The magnetic head 11 is provided close to the surface 12a of the magnetic disk 12.

The SPM 101 is controlled by a control module 210, described later. The control for the SPM 101 includes control for maintaining the SPM 101 at a predetermined rotational speed, and control for starting/stopping the SPM 101. The VCM driving mechanism 103 is also controlled by the control module 210. In accordance with instructions from the control module 210, the VCM driving mechanism 103 loads the magnetic head 11 onto the magnetic disk 12, unloads the same from the disk 12, and executes a seek operation of moving the magnetic head 11 to a target track on the magnetic disk 12. The VCM driving mechanism 103 includes a VCM (voice coil motor), and executes the seek operation by controlling the angular movement of an actuator 104 with the magnetic head 11 mounted thereon.

In the magnetic disk drive of FIG. 8, another magnetic head 14 is provided close to the surface 12*b* of the magnetic disk 12. However, for simplifying the description, the magnetic head 14 will not be described. However, if necessary, in the description below, the magnetic head 11 may be replaced with the magnetic head 14.

In the HDA unit 100, a head amplifier 121 is provided on a flexible printed circuit board (FPC) that is located near the VCM driving mechanism 103. The head amplifier 121 is electrically connected to the magnetic head 11 and the control module 210 via the FPC. However, in FIG. 8, the head amplifier 121 is drawn away from the VCM driving mechanism 103 for convenience of drawing. The head amplifier 121 may be mounted on the actuator 104, or be provided on the PCB unit 200.

The head amplifier 121 comprises a read amplifier, a write driver and a power amplifier, which are not shown. The read amplifier amplifies a signal (read signal) read by the head 121. The write driver converts, into a write current (write signal), write data transferred from a read channel 211, described later, and outputs the same to the magnetic head 11. The power amplifier supplies a heating element incorporated in the magnetic head 11 with power (i.e., DFH power) for controlling the dynamic flying height of the magnetic head 11, in accordance with an instruction from a disk controller 212, described later.

The PCB unit 200 comprises a control module 210 and a power control amplifier 220. The control module 210 and the power control amplifier 220 are mounted on a printed circuit board, not shown. The control module 210 comprises a read channel (RDC) 211 and a hard disk controller (hereinafter, HDC) 212. The read channel 211 executes signal processing associated with read/write. Namely, the read channel 211 converts, into digital data, a read signal amplified by the head amplifier 121, and decodes read data from the digital data. The read channel 211 extracts servo data (servo pattern) from the digital data. The read channel 211 encodes write data transferred from the HDC 212, and transfers the encoded write data to the head amplifier 121. Further, the read channel 211 has a function of monitoring the aforementioned timestamps.

The HDC 212 transmits and receives signals to and from a host via an external interface. More specifically, the HDC 212 receives commands (write and read commands, etc.) transferred from the host via the external interface. The HDC 212 controls data transfer between the host and the HDC itself. The HDC 212 generates write data in accordance with a data signal transferred from the host via the external interface. The HDC 212 controls data transfer executed between the HDC itself and the magnetic disk 12 via the read channel 211. The HDC 212 controls the spindle motor 101, the VCM driving mechanism 103, etc. In the embodiment, control signals for controlling the spindle motor 101 and the VCM driving mechanism 103 are generated by the power control amplifier 220 under the control of the HDC 212. The HDC 212 supplies DFH power to the heating element, incorporated in the magnetic head 11, via the head amplifier 121.

In accordance with recent tendency of high recording density in magnetic disk drives, magnetic marks recorded on magnetic disks are more and more reduced in size. To realize high recording density, it is necessary to reduce the magnetic spacing between the magnetic disk and the magnetic head. To this end, the magnetic head incorporates a heating element, and each of the magnetic disk drives controls the DFH power to the heating element to thereby adjust the dynamic flying height of the magnetic head. Namely, in each of the magnetic disk drives, the thermal expansion of the magnetic head is controlled to adjust the amount of projection of the read/write element of the magnetic head, thereby adjusting the dynamic flying height of the magnetic head to a predetermined value. Also in the magnetic disk drive shown in FIG. 8, the magnetic head 11 includes the heating element, and the dynamic flying height of the magnetic head 11 is controlled by controlling the DFH power supplied from the head amplifier 121 to the heating element, using the HDC 212 of the control module 210.

In general, if no DFH power is supplied, the magnetic heads of different magnetic disks have different dynamic flying heights. Further, when a magnetic disk drive incorporates a plurality of magnetic heads, these magnetic heads also generally exhibit different dynamic flying heights if no DFH power is supplied. In light of this, to correct the dynamic flying height of each magnetic head, the magnetic head is brought into contact with a corresponding magnetic disk to detect a state in which its dynamic flying height is zero.

In the prior art, the state in which the dynamic flying height of the magnetic head is zero, i.e., in which the magnetic head contacts the magnetic disk, is detected using a track position error signal (PES), as is mentioned before. However, it is difficult to detect the touchdown of the magnetic head using the PES, for the following reasons:

The magnetic head is swung by the rotary pivot of the VCM driving mechanism to trace an arc with respect to the magnetic disk. In this case, a certain angle (so-called skew angle) is inevitably formed between the position of the magnetic head on the inner circumferential portion of the magnetic disk and that of the magnetic head on the outer circumferential portion of the same, with respect to the direction of revolution (i.e., along the circumference) of the disk. Accordingly, when the magnetic head contacts the magnetic disk, a contact frictional force will occur therebetween to thereby produce drag force components in the circumferential and radial directions of the magnetic disk.

At this time, the positioning control of settling the magnetic head to a target track on the magnetic disk against the radial drag force component is executed. However, because of the influence of, for example, vibration (swing) that occurs when the magnetic head contacts the magnetic disk, the magnetic head cannot be reliably settled on the target track. As a result, the amplitude (hereinafter, referred to as the "PES value") of the PES is increased. In the prior art, touchdown is detected by detecting an increase in the PES value.

However, when the target track is in the radially middle portion of the magnetic disk, i.e., when the magnetic head is positioned on a target track situated in the radially middle portion of the magnetic disk, the direction in which the contact frictional force acts coincides with that in which the drag force of the magnetic head acts, and hence the radial swing of the magnetic head is small. In this case, a change in radial deviation of the magnetic head from the target track is hard to appear, and little change is found in the PES value. This makes it difficult to detect touchdown of the magnetic head.

In view of this, the embodiment employs the above-described method of detecting a change in the rotational speed of the magnetic disk 12 caused by the contact frictional force 13 (see FIG. 1) that occurs when the magnetic head 11 contacts the magnetic disk 12, thereby detecting touchdown of the magnetic head 11. Further, the embodiment uses timestamps to quantitatively detect a change in the rotational speed of the magnetic disk 12 (see FIGS. 3A, 3B and 3C).

As aforementioned, the timestamps indicate time intervals at which the servo areas 31 on the magnetic disk 12 pass the magnetic head 11 in accordance with the rotation of the magnetic disk 12. In the embodiment, the values obtained by measuring the SSMF intervals of an SSMF signal that indicate the detection times of the servo synchronization marks (SSM) recorded on the servo areas 31 are used as the timestamps.

The read channel 211 monitors the timestamps during a servo operation for positioning the magnetic head 11 on a target track on the magnetic disk 12, and during a write operation for writing data to the magnetic disk 12. The monitored timestamps obtained during the servo operation and during the write operation are used for adjusting the servo acquisition frequency and the write lock frequency, respectively.

The servo areas 21 on the magnetic disk 12, on which the servo patterns are recorded, are not concentrically but are eccentrically positioned with respect to the magnetic head 11. This is because the magnetic disk 12 is rotated at different centers of rotation between a servo track writer for discretely recording the servo patterns on the magnetic disk 12, and the magnetic disk drive provided with the magnetic disk 12 with the servo patterns recorded thereon.

Accordingly, different circumferential speeds are detected at different servo patterns (servo areas 21) in accordance with the degrees of eccentricity. This may well cause a change in the servo acquisition frequency and result in degradation of the stability of the servo operation. To avoid this, the read channel 211 monitors the timestamps to detect a change in the rotational speed of the magnetic disk 12 and stabilize the servo acquisition frequency based on the detected change.

In the embodiment, the timestamps monitored by the read channel 211 are used to detect touchdown of the magnetic head 11. Namely, the embodiment employs a method of observing a timestamp change to detect a change in the rotational speed of the magnetic disk 12 due to the touchdown of the magnetic head 11.

Referring then to the flowchart of FIG. 9, a description will be given of an exemplary procedure of measuring (detecting) touchdown employed in the embodiment, using, as an example, touchdown measurement in an adjusting/checking process performed when shipping such magnetic disks as shown in FIG. 8. Assume here that the HDC 212 has received a measurement command from the host. The HDC 212 starts touchdown measurement (block 900).

Firstly, the HDC 212 controls the VCM driving mechanism 13 via the power control amplifier 220 to move the magnetic head 11 to a target zone on the magnetic disk 12 (block 901). In the embodiment, the magnetic disk 12 is divided, for management, into a plurality of radial zones. Assume here that touchdown is measured in each of the radially inner, middle and outer zones of the magnetic disk 12. However, the number of zones as measurement targets is not limited to three. For instance, if the flying height characteristic of the magnetic head 11 is varied at radial positions on the magnetic disk 12 by a design of the air bearing surface (ABS) of the magnetic head 11, the number of target zones may be increased for detailed checking.

Then, in order to change the dynamic flying height of the magnetic head 11 to detect touchdown of the magnetic head 11, the HDC 212 functions as a dynamic flying height controller to set DFH power to be supplied to the heating element provided in the magnetic head 111 (block 902). That is, the HDC 212 sets, for the head amplifier 121, the DFH power control value (DFH power parameter) designating the DFH power to be supplied to the heating element. Thus, the head amplifier 121 supplies the DFH power indicated by the set DFH power control value, to the heating element provided in the magnetic head 11 only during the period for which the supply of the DFH power is specified by the HDC 212.

The HDC 212 increases the DFH power every time block 902 is carried out. In the head amplifier 121, the maximum DFH power that can be supplied to the heating element is divided into 256-step values indicated by 8-bit data. Thus, in the embodiment, the HDC 212 gradually changes (in this case, increases) the DFH power in units of one resolution (in units of one step or one dac). Changing the DFH power in this manner changes the amount of thermal expansion of the magnetic head 11. This changes the distance by which the read/write element provided in the magnetic head 11 projects and thus the dynamic flying height of the magnetic head 11.

Then, the HDC 212 changes the control of SPM 101 from feedback control to open loop control (block 903). Thus, during the period of the open loop control, the HDC 212 supplies a predetermined current (SPM current) to SPM 101 via the power control amplifier 220. During this period, even when the rotational speed of SPM 101 changes from a predetermined value, the HDC 212 avoids correcting the changed rotational speed to the predetermined value.

Then, the HDC 212 functions as a timestamp measurement module. The HDC 212 issues a timestamp acquisition command described below to, for example, the read channel 211 to measure timestamps using the read channel 211 (block 904). In the embodiment, timestamps are measured during the period of the first number of revolutions and the period of the second number of revolutions following the period of the first number of revolutions. The HDC 212 instructs the head amplifier 121 to avoid supplying DFH power to the heating element during the period of the first number of revolutions, while supplying DFH power to the heating element during the period of the second number of revolutions. The first number of revolutions is equal to the second number of revolutions, for example, 10. The measured timestamps are temporarily stored in a rewritable memory provided in the HDC 212, for example, RAM. Upon completing the measurement of timestamps (block 904), the HDC 212 returns the control of SPM 101 to the original feedback control (block 905).

Then, the HDC 212 functions as a timestamp difference calculation module to calculate the timestamp difference at every SSMF for the same servo area 41 based on the measured timestamps (block 906). That is, the HDC 212 calculates the timestamp difference to be the difference between the timestamp (hereinafter referred to as the first timestamp) obtained while no DFH power is supplied to the heating element (the timestamp obtained in a DFH-OFF state) and the timestamp (hereinafter referred to as the second timestamp) obtained while DFH power is supplied to the heating element (the timestamp obtained in a DFH-ON state) at every SSMF for the same servo area 41. The calculated timestamp difference at every SSMF is temporarily stored in RAM. That is, the calculated timestamp differences at times SSMF are temporarily stored in RAM. However, in the embodiment, the DFH power (DFH power control value) set by carrying out block 902 for the first time is zero (0 dac) as described below.

Then, the HDC 212 functions as a timestamp gradient calculation module to calculate a timestamp gradient corresponding to the currently set DFH power (hereinafter referred to as the current DFH power) based on the calculated timestamp differences (block 907). Then, the HDC 212 determines whether or not the number of measurements at the current DFH power (block 904) has reached a predetermined value N (block 908). If the number of timestamp measurements has not reached N (No at block 908), the HDC 212 carries out blocks 903 to 907 again with the current DFH power.

Then, when the number of timestamp measurements reaches N (Yes at block 908), the HDC 212 determines that all the measurement data required for touchdown determination (detection) has been acquired. The HDC 212 then functions as a touchdown determination calculation module to carry out a calculation (touchdown determination calculation) for acquiring data to be utilized for the touchdown determination (block 909). The touchdown determination calculation will be described below in brief.

First, the HDC 212 calculates the average value of the timestamp gradients corresponding to the results of N measurements at the current DFH power (the average value is hereinafter referred to as the timestamp gradient value). The calculated timestamp gradient value is stored in RAM in association with the current DFH power. Then, based on the timestamp gradient value already acquired at each DFH power, the HDC 212 acquires the linear approximate equation Y=AX+B indicative of the relationship of the timestamp gradient value Y with the DFH power (more specifically, the DFH power control value). The linear approximate equation Y=AX+B is acquired for the following reason. First, the actual timestamp gradient value acquired at each DFH power, that is, the measured timestamp gradient value, may vary. Thus, in the embodiment, the linear approximate equation Y=AX+B is acquired in order to obtain the average timestamp gradient value at each DFH power.

Based on the acquired linear approximate equation Y=AX+B and the current DFH power X1, the HDC 212 acquires an average touchdown gradient value Y1 corresponding to the current DFH power X1, that is, an estimated touchdown gradient value Y1. Based on the estimated touchdown gradient value Y1 and a standard deviation σ described below, the HDC 212 acquires a threshold to be used for touchdown determination at the current DFH power X1. Thus, the touchdown determination calculation (block 909) ends.

Then, the HDC 212 determines whether or not the measured timestamp gradient value (measurement value) corresponding to the current DFH power is greater than the threshold (block 910). If the measured timestamp gradient value is not greater than the threshold (No at block 910), the HDC 212 returns to block 902. In block 902, the HDC 212 increases the DFH power (more specifically, the DFH power control value designating the DFH power) to be supplied to the heating element by the head simplifier 121, for example, by 1 dac in order to reduce the dynamic flying height of the magnetic head 11 from the current value. Then, the HDC 212 changes the control of SPM 101 from feedback control to open loop control (block 903). The HDC 212 then proceeds to block 903 to start measuring timestamps again.

In contrast, if the measured timestamp gradient value is greater than the threshold (Yes at block 910), the HDC 212 determines the current DFH power, that is, the DFH power at which the measured timestamp gradient value exceeds the threshold, to be the DFH power required to allow touchdown of the magnetic disk 12 (this DFH power corresponds to a touchdown determination result). The HDC 212 then notifies the host of the determined DFH power as the touchdown determination result (block 911). Thus, the HDC 212 ends the touchdown measurement.

Based on the DFH power required to allow touchdown of the magnetic head 11, the host determines the DFH power required to adjust the dynamic flying height of the magnetic head 11 to a predetermined value. The host sets the DFH power control value designating the determined DFH power in, for example, a flash ROM (that is, a rewritable nonvolatile memory; not shown in the drawings) in the HDC 212 in association with the magnetic head 11. Thus, the HDC 212 can accurately adjust the dynamic flying height of the magnetic head 11 during read or write to a predetermined value based on the DFH power control value set in the flash ROM in association with the magnetic head 11. The HDC 212 can also carry out such calibration of the DFH power for adjusting the dynamic flying height of the magnetic head 11 to the predetermined value, independently of the host when the quality of a read signal or a write signal is lower than a reference level even after shipment of the magnetic disk drive.

Now, blocks 903, 904, 906, 907, and 909 in the above-described touchdown measurement will be described in detail. First, the change in the control of SPM 101 performed at block 903 will be described. As described above, the HDC 212 performs feedback control for controlling SPM 101 so that SPM 101 can rotate continuously at a predetermined rotational speed. That is, the HDC 212 monitors a change in the rotational speed of SPM 101. If the rotational speed of SPM 101 changes under the adverse effect of a disturbance or the like, the HDC 212 immediately changes the current supplied to SPM 101 based on the change in the rotational speed of SPM 101. Such feedback control allows the rotational speed of SPM 101 to be quickly corrected to a predetermined value.

Thus, even if the magnetic head 11 comes into contact with the magnetic disk 12 to temporarily change the rotational speed of the magnetic disk 12 while SPM 101 is subjected to feedback control, the rotational speed is corrected to a predetermined value. Thus, even if the dynamic flying height of the magnetic head 11 is gradually reduced to bring the magnetic head 11 into contact with the magnetic disk 12 for touchdown measurement, an observed change in the rotational speed of the magnetic disk 12 may fail to exhibit a sufficiently great value. Furthermore, when the rotational speed of SPM 101 is corrected to a predetermined value by the feedback control, overshooting or undershooting may occur to vary the rotation. This variation corresponds to noise components appearing when a change in rotational speed resulting from touchdown is detected.

Thus, in the embodiment, before the measurement of timestamps (block 904), the control of SPM 101 is changed from feedback control to open loop control. Hence, a change in rotational speed caused by the contact between the magnetic head 11 and the magnetic disk 12 appears without being corrected. Furthermore, in the open loop control, a predetermined current is supplied to SPM 101. This prevents a possible change in rotational speed caused by the feedback control. That is, the embodiment can prevent the above-described generation of noise components which cannot be avoided by the feedback control.

Now, an exemplary procedure for the timestamp measurement carried out at block 904 will be described with reference to the flowchart in FIG. 10. The HDC 212 issues, to the read channel 212, a timestamp acquisition command to acquire timestamps (block 1001). The timestamp acquisition command includes an acquisition number M of timestamps as a parameter. When the timestamp acquisition command is issued, the HDC 212 sets, in the read channel 211, the acquisition number M of timestamps designated by the command (block 1002).

In the basic timestamp acquisition method used in the embodiment, timestamps corresponding to a plurality of revolutions R need to be acquired in each of the DFH-OFF state and the DFH-ON state. In this case, supposing that the number of servo areas 31 (i.e., the number of servo sectors) passed by the magnetic head 11 while the magnetic disk 12 makes one revolution is S, acquisition of $2R \times S$ (=M) timestamps is designated. In the example illustrated in FIGS. 4A and 4B, R is 10. Thus, M is 20×S. The number of revolutions R may be designated instead of the acquisition number M.

When the designated acquisition number M is set in the read channel 211, the read channel 211 starts measurement of timestamps designed by the timestamp acquisition command in accordance with a firmware program. At this time, servo reading processing (block 1003) for reading a servo pattern recorded on each servo area 21 is executed. The firmware program is stored in a nonvolatile memory, such as a ROM or a flash ROM, incorporated in the magnetic disk drive shown in FIG. 8.

In servo reading processing, servo synchronization marks (SSM) are detected. Specifically, in servo reading processing, the read channel 211 measures the interval, i.e., a timestamp, between the detection time of the current servo synchronization mark and the servo synchronization mark detection time in the preceding servo reading processing. The read channel 211 temporarily holds the measured timestamp in a predetermined register therein.

After completing the servo reading processing, the read channel 211 reads the timestamp (register value) held by the predetermined register (block 1004), and stores the value in, for example, a first-in first-out buffer, not shown, incorporated therein (block 1005). At this time, the read channel 211 reports the completion of one-time servo reading to the HDC 212.

The HDC 212 counts the number of times of completed servo reading informed by the read channel 211, thereby counting the number of timestamps stored in the buffer of the read channel 211, namely, the timestamp acquisition number. Whenever completion of servo reading is reported by the read channel 211, the HDC 212 determines whether the timestamp acquisition number reaches the designated acquisition number M (block 1006).

If the timestamp acquisition number does not reach M (No at block 1006), the HDC 212 instructs the read channel 211 to re-execute the above-described operations (blocks 1003 to 1005). Thus, the HDC 212 controls the iteration of the operations in blocks 1003 to 1005 by the read channel 211 until the timestamp acquisition number reaches M. If the timestamp acquisition number has reached M (Yes at block 1006), the HDC 212 reads the same number of timestamps as the number M from the buffer to the RAM of the HDC 212 in a time-series manner (block 1007). As a result, the HDC 212 acquires the same number of timestamps as the acquisition number M designated for the read channel 211.

In the embodiment, the HDC 212 sets the heating element to stay in the DFH-OFF state during the period of the first number of revolutions R to acquire M/2 timestamps, that is, R×S timestamps (first timestamps) as reference values (see FIG. 4A). The HDC 212 also sets the heating element to stay in the DFH-ON state during the succeeding period of the second number of revolutions R to acquire the remaining M/2 timestamps, that is, R×S timestamps (second timestamps) as estimated values (see FIG. 4B). Here, R is 10 as described above. However, at most the number of timestamps corresponding to several revolutions is sufficient, though the number may depend on the characteristics of the magnetic disk drive.

Now, the timestamp difference calculation carried out at block 906 will be described in detail. Upon completing measuring timestamps using the read channel 211, the HDC 212 calculates the timestamp differences. That is, the HDC 212 calculates the timestamp differences upon acquire M/2 first timestamps and M/2 second timestamps measured by the read channel 211.

FIG. 4A shows how the first timestamps change in response to the rotation of the magnetic disk 12 in the DFH-OFF state, that is, while the dynamic flying height of the magnetic head 11 is not set lower, as described above. The DFH-OFF state also corresponds to the non-TD state in which the magnetic head 11 is out of contact with the magnetic disk 12. In the example illustrated in FIG. 4A, the first timestamps vary in a sine curve in response to the eccentric positioning of the magnetic disk 12.

FIG. 4B shows how the second timestamps change in response to the rotation of the magnetic disk 12 in the DFH-ON state, that is, while the dynamic flying height of the magnetic head 11 is set lower. In the DFH-ON state, the touchdown state (TD state) in which the magnetic head 11 is in contact with the magnetic disk 12 may be established depending on the magnitude of the DFH power. FIG. 4B shows changes in the second timestamps in such a touchdown state. In the example shown in FIG. 4B, the second timestamps change in response to the eccentric positioning of the magnetic disk 12, and furthermore the changes in the second timestamps increase consistently with the number of revolutions under the effect of the touchdown. Accordingly, it should be noted that the first timestamps and second timestamps reflect the effect of the eccentricity of the magnetic disk 12.

Thus, the HDC 212 calculates the M/2 differences between the M/2 first timestamps (reference values) and the M/2 second timestamps (estimated values) at times SSMF for the servo areas 31. This difference calculation allows the effect of eccentricity of the magnetic disk 12 to be offset, enabling only the changes in timestamps to be extracted.

FIG. 5 shows three examples of the timestamp differences as described above. The curve 51 represents changes in timestamp differences with respect to the number of revolutions observed when the second timestamp values are acquired with the magnetic head 11 out of contact with the magnetic disk 12 because of low DFH power in the DFH-ON state. The curve 51 is almost straight and has a gradient close to zero.

The curve 52 represents changes in timestamp differences with respect to the number of revolutions observed when the magnetic head 11 is in slight contact with the magnetic disk 12 because of the medium level of the DFH power in the DFH-ON state. The curve 53 represents changes in timestamp differences with respect to the number of revolutions observed when the magnetic head 11 is in tight contact with the magnetic disk 12 because of high DFH power in the DFH-ON state. The curves 52 and 53 are almost straight and have a gradient increasing consistently with the tightness of the contact of the magnetic head 11 with the magnetic disk 12.

Now, the timestamp gradient calculation carried out at block 907 will be described in detail. Upon completing calculating the timestamp difference at the current DFH power, the HDC 212 calculates the timestamp gradient based on the timestamp difference. That is, the HDC 212 acquires the linear approximate equation $y=ax+b$ by a calculation for linearly approximating changes in timestamp differences y with respect to the number x of revolutions.

The gradient "a" in the linear approximate equation $y=ax+b$ indicates a timestamp change at the current DFH power. Hence, by approximating changes in timestamp differences y with respect to the number x of revolutions, by a straight line, the HDC 212 can determine the characteristics of a change in timestamp at the current DFH power. Thus, the HDC 212 acquires the gradient "a" in the linear approximate equation $y=ax+b$, as the timestamp gradient indicative of a change in timestamp at the current DFH power. The timestamp gradient acquired is stored in the RAM in association with the current DFH power.

If timestamps are measured in an environment involving a disturbance such as vibration, a change in timestamp caused by the disturbance may also be detected. In this case, the adverse effect of the disturbance can be reduced by approximating changes in timestamp differences y with respect to the number x of revolutions, by a straight line, as described above. That is, the embodiment allows timestamps to be measured stably against the disturbance.

Now, an exemplary procedure for the touchdown determination calculation carried out at block 909 will be described with reference to the flowchart in FIG. 11. In the embodiment, every time block 902 is carried out, the DFH power (or the DFH power control value designating the DFH power) is increased by 1 dac as described above. In the touchdown measurement in accordance with flowchart in FIG. 9, the DFH power set by carrying out block 902 for the first time, that is, the DFH power set at the start of the touchdown measurement, is referred to as measurement-start DFH power. In the embodiment, the measurement-start DFH power is zero. That is, the DFH power control value designating the DFH power is zero (0 dac).

Furthermore, in the embodiment, after block 902 is carried out once, that is, after the DFH power (or the DFH power control value designating the DFH power) reaches a predetermined value (for example, 10 dac), calculation of a threshold used for timestamp determination is started. Thus, this DFH power (10 dac) is hereinafter referred to as determination-start DFH power.

First, the HDC 212 determines whether or not the current DFH power is the measurement-start DFH power (block 1101). If the current DFH power is the measurement-start DFH power (Yes at block 1101), the HDC 212 calculates the standard deviation σ of the timestamp gradient for N samples at the measurement-start DFH power (block 1102). The HDC 212 stores the calculated standard deviation σ in the RAM in the HDC 212 (block 1103), and then ends the touchdown determination calculation. In contrast, if the current DFH power is not the measurement-start DFH power (No at block 1101), the HDC 212 determines whether or not the current DFH power is the determination-start power (block 1104). If the current DFH power is not the determination-start DFH power (No at block 1104), the HDC 212 ends the touchdown determination calculation without carrying out any processing.

It is assumed that after block 902 is carried out a predetermined number of (here, 10) times, the current DFH power is equal to the determination-start DFH power. Thus, when the current DFH power is the determination-start DFH power (Yes at block 1104), the HDC 212 carries out processing required to calculate the threshold to be used for the timestamp determination, as follows. First, based on the timestamp gradient value already acquired at each DFH power, the HDC 212 carries out a linear approximate calculation required to acquire the linear approximate equation Y=AX+B indicative of the relationship of the timestamp gradient value Y with the DFH power (more specifically, the DFH power control value) X (block 1105).

Then, the HDC 212 substitutes the current DFH power (current DFH power control value) X1, as a variable X, into the linear approximate equation Y=AX+B acquired by the linear approximate calculation to calculate the current value Y1 of Y (block 1106). At block 1106, the HDC 212 acquires the calculated value Y1 as the estimated touchdown gradient value Y1 corresponding to the current DFH power X1.

As described above, the estimated touchdown gradient value Y1 is acquired based on the linear approximate equation (Y=AX+B) and the current DFH power X1. The linear approximate equation (Y=AX+B) is calculated by the linear approximate calculation based on the timestamp gradient value already acquired at each DFH power. In other words, the estimated touchdown gradient value Y1 is the average touchdown gradient value at the current DFH power. The actual timestamp gradient value at the current DFH power X1, that is, the measured timestamp gradient value, may vary with respect to the estimated touchdown gradient value Y1.

Thus, in view of this variation, the HDC 212 determines the threshold to be used for the touchdown determination at the current DFH power X1. Specifically, based on the estimated touchdown gradient value Y1 acquired at block 1106 and the standard deviation σ stored in RAM at block 1103 described above, the HDC 212 calculates the threshold to be used for the touchdown determination at the current DFH power X1 in accordance with the following expression (predetermined rule) (block 1107).

$$\text{Threshold}=Y1+3\sigma$$

Figure 9:
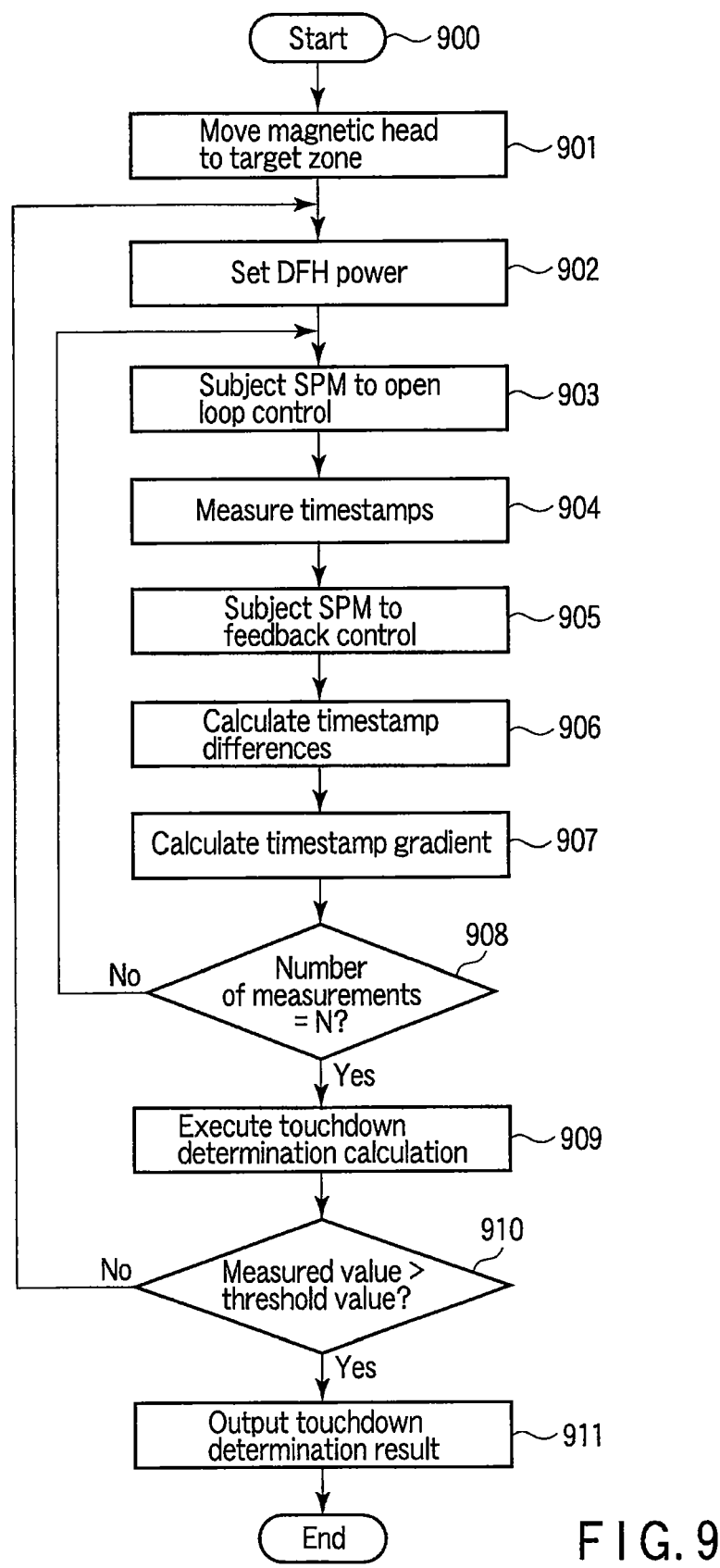
FIG. 9 is a flowchart illustrating an exemplary procedure for touchdown measurement used in the embodiment.
Figure 11:
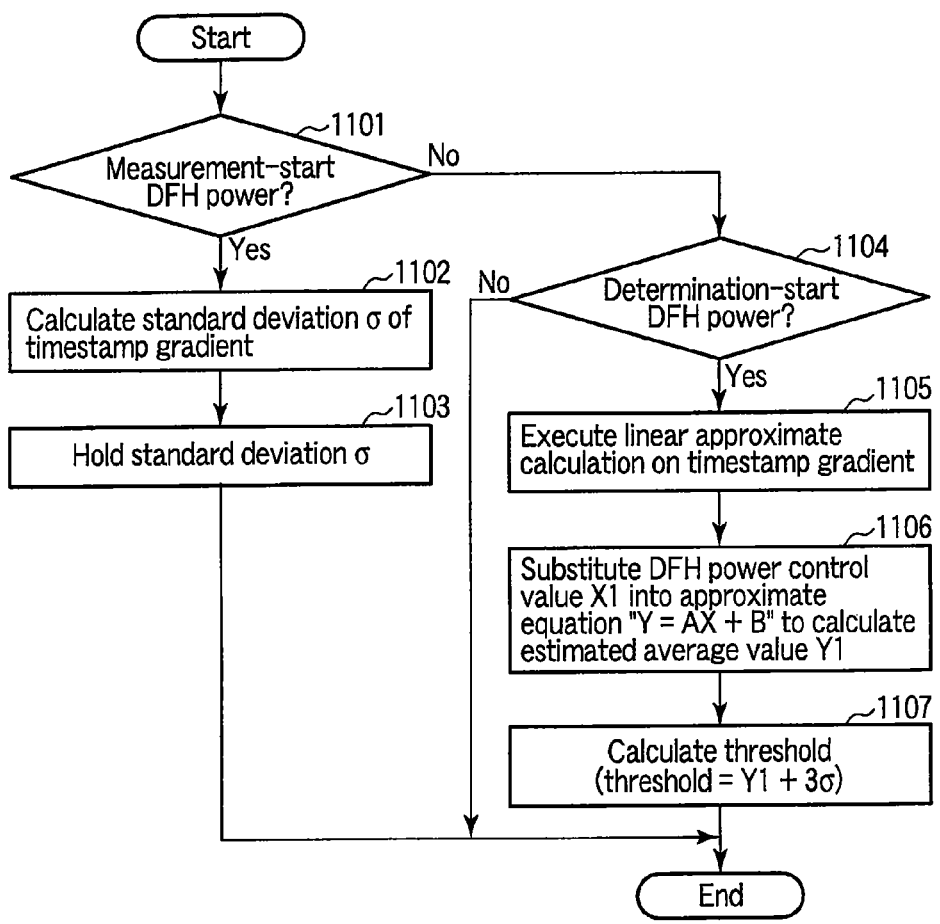
FIG. 11 is a flowchart illustrating an exemplary procedure for a touchdown determination calculation used in the embodiment.

Thus, the HDC 212 ends block 909 (touchdown determination calculation) in FIG. 9 in accordance with the flowchart in FIG. 11.

Upon ending block 909, the HDC 212 determines whether or not the timestamp gradient value (measured timestamp gradient value) acquired at the current DFH power is greater than the threshold as described above (block 910). In the embodiment, the threshold is Y1+3σ. That is, the HDC 212 determines whether or not the measured timestamp gradient value at the current DFH power deviates from the estimated timestamp gradient value (average timestamp gradient value) Y1 by more than 3σ (which is triple the standard deviation). Any value other than 3σ may be used as the value used to determine the level of this deviation provided that the value reflects a variation in timestamp gradient value.

If the measured timestamp gradient value is not greater than the threshold (No at block 910), the HDC 212 returns to block 902. While the current DFH power is not the measurement-start DFH power, the HDC 212 determines the measured timestamp gradient value not to be greater than the threshold, regardless of the measured timestamp gradient value, and returns to block 902. That is, the substantial determination at block 910 is made only while the current DFH is the measurement-start DFH power. In contrast, if the timestamp gradient value is greater than the threshold (Yes at block 910), the HDC 212 carries out block 911 to end the touchdown measurement in accordance with the flowchart in FIG. 9 as described above.

Figure 12:
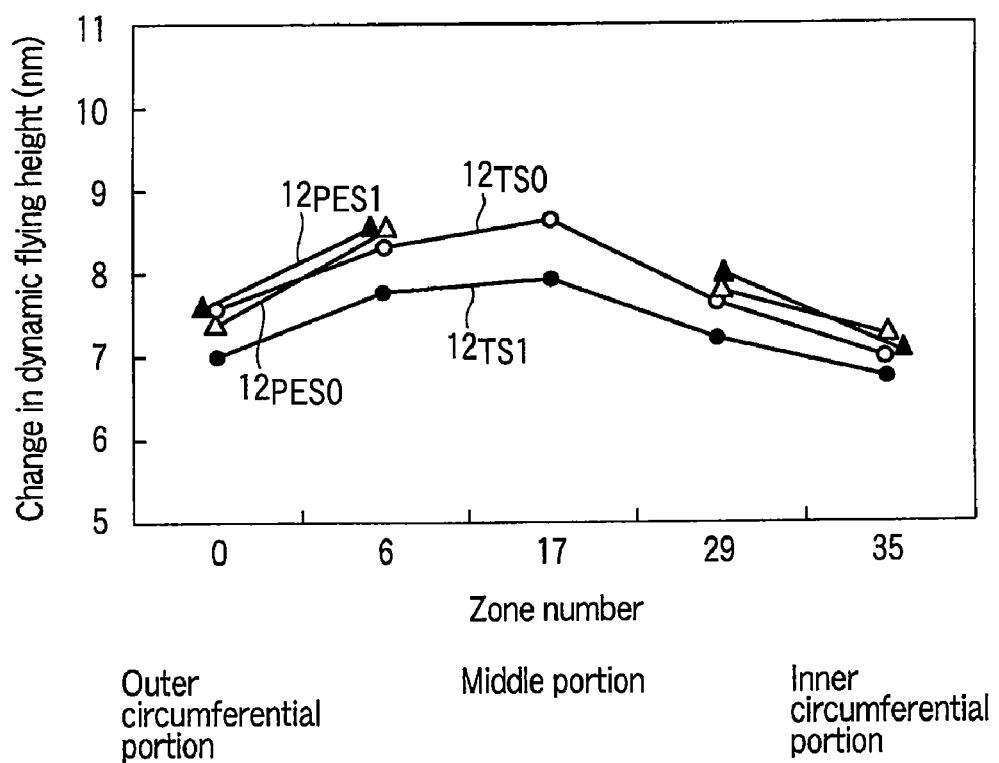
FIG. 12 is a diagram illustrating an example of results of measurement of a touchdown point according to the embodiment wherein a zone on the magnetic disk in which two magnetic heads are positioned is switched, in comparison with the results of measurement of the touchdown point using the conventional technique.

FIG. 12 illustrates an example of results of measurement of a touchdown point wherein a zone on the magnetic disk 12 in which the magnetic heads 11 and 14 are positioned is switched. Here, it is assumed that the number of zones on the magnetic disk 12 is 36, that is, the magnetic disk 12 include 36 zones starting with a zone 0 positioned at an outer circumference and ending with a zone 35 positioned at an inner circumference. FIG. 12 also illustrates the results of measurement of touchdown point based on PES in accordance with the conventional technique.

In FIG. 12, polygonal lines 12$_{TS0}$ and 12$_{TS1}$ indicate the results of touchdown measurement for the magnetic heads 11 and 14, respectively, based on timestamps (timestamp method). Polygonal lines 12$_{PES0}$ and 12$_{PES1}$ indicate the results of touchdown measurement for the magnetic heads 11 and 14, respectively, based on the well known PES (PES method). In FIG. 12, the axis of ordinate represents the reduced dynamic flying height (relative dynamic flying height) resulting from the supply of DFH power when the dynamic flying height obtained with no DFH power supplied is assumed to be 0 nanometer (nm). The axis of abscissas represents the zone number of each zone on the magnetic disk 12 in which the magnetic heads 11 and 14 are positioned during the touchdown measurement.

As is apparent from FIG. 12, the results of the touchdown measurement for the magnetic head 11 are almost equivalent between the PES method and the timestamp method in the inner circumferential portion and outer circumferential portion of the magnetic disk 12. On the other hand, the results of the touchdown measurement for the magnetic head 14 are different between the PES method and the timestamp method even in the inner circumferential portion and outer circumferential portion of the magnetic disk 12. That is, for the magnetic head 14, the results of the touchdown measurement based on the timestamp method indicate more insignificant changes in dynamic flying height and successful detection of touchdown at higher flying positions. Furthermore, in the middle portion (more specifically, a zone 17) of the magnetic disk 12, for neither the magnetic disk 11 nor the magnetic disk 14, the touchdown point can be detected by the PES method. In contrast, for the timestamp method, even in the middle portion of the magnetic disk 12, the touchdown points of both the magnetic heads 11 and 14 can be stably detected.

In recent magnetic disk drives, to improve the characteristic of the head disk interface (HDI), there is a tendency to coat the surface of the magnetic disk with a lubricating agent of a low frictional resistance. However, in the touchdown measurement using the PES method, if the surface of the magnetic disk is coated with a lubricating agent of a low frictional resistance, a change in PES value at the time of touchdown becomes small, which makes it difficult to detect the touchdown. In contrast, in the embodiment where the timestamp method is used, and touchdown is measured by detecting a change in the rotational speed of the magnetic disk 12, reliable touchdown detection with little influence of the lubricating agent can be realized. Furthermore, in the embodiment, a change in the rotational speed of the magnetic disk 12 can be detected with the control of SPM 101 changed from feedback control to open loop control. Thus, a change in the rotational speed of the magnetic disk 12 can be more clearly detected.

Thus, in the embodiment, the touchdown point of the magnetic head 11, i.e., the point (DFH power) referred to when adjusting the dynamic flying height of the magnetic head 11 can be accurately measured. By adjusting the dynamic flying height of the magnetic head 11 based on the measurement result, the quality of read/write signals can be stabilized to thereby provide a magnetic disk drive of high performance. Further, by the above-described method, the touchdown point of the magnetic head 11 can also be measured accurately.

In the above-described at least one embodiment, touchdown of the magnetic head can be accurately detected even at the radially middle portion of the magnetic disk.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of detecting contact of a magnetic head with a magnetic disk, comprising:
   (a) setting a dynamic flying height (DFH) of the magnetic head;
   (b) subjecting a spindle motor configured to rotate the magnetic disk to open loop control;
   (c) after each revolution of the magnetic disk for a predetermined number of revolutions, measuring a first timestamp during a first state in which the magnetic head is out of contact with the magnetic disk and while the spindle motor is subjected to open loop control;
   (d) after each revolution of the magnetic disk for the predetermined number of revolutions, measuring a second timestamp during a second state in which the DFH of the magnetic head is made lower than in the first state to bring the magnetic head into contact with the magnetic disk and while the spindle motor is subjected to open loop control;
   (e) approximating, by a straight line, changes in the second timestamps relative to the first timestamps with respect to the number of revolutions or the number of servo areas corresponding to the number of revolutions;
   (f) obtaining a gradient of the straight line approximating the changes in the second timestamps relative to the first timestamps, as a timestamp gradient;
   (g) repeating (a) through (f) for one or more different DFHs of the magnetic head; and
   (h) detecting contact of the magnetic head with the magnetic disk based on a rate of change in the timestamp gradient with respect to changes in the DFH of the magnetic head.

2. The method of claim 1, further comprising:
   obtaining a linear approximate equation approximating a change in the detected timestamp gradient with respect to the changes in the DFH of the magnetic head; and
   obtaining an average timestamp gradient corresponding to a current DFH based on the obtained linear approximate equation and the DFH,
   wherein contact of the magnetic head with the magnetic disk is detected based on a degree at which the timestamp gradient obtained for the current DFH deviates from the average timestamp gradient.

3. The method of claim 2, further comprising calculating a standard deviation of multiple samples of the timestamp gradient obtained for the current DFH,
   wherein the calculated standard deviation is used to determine the degree of the deviation.

4. The method of claim 1, wherein servo synchronization marks are arranged on the magnetic disk, and first and second timestamps each represent a time period the magnetic head takes to detect two of the servo synchronization marks.

5. The method of claim 1, wherein the first state and the second state are temporally continuous.

6. A magnetic disk drive comprising:
   a magnetic head;
   a spindle motor configured to rotate a magnetic disk;
   a spindle motor controller configured to subject the spindle motor to open loop control:
   a measurement module configured to measure, for each of a plurality of settings of dynamic fly height (DFH) of the magnetic disk and after each revolution of the magnetic disk for a predetermined number of revolutions, first timestamps in a first state in which the magnetic head is out of contact with the magnetic disk and the spindle motor controller is subjecting the spindle motor to open loop control, and second timestamps in a second state in which the DFH of the magnetic head is made lower than in the first state to bring the magnetic head into contact with the magnetic disk and the spindle motor controller is subjecting the spindle motor to open loop control;

a first module configured:

to approximate, by a straight line, changes in the second timestamps relative to the first timestamps with respect to the number of revolutions or the number of servo areas corresponding to the number of revolutions at each DFH setting, and to obtain a gradient of the straight line approximating the changes in the second timestamps relative to the first timestamps, as a timestamp gradient at each DFH setting; and a second module configured to detect contact of the magnetic head with the magnetic disk based on a rate of change in the timestamp gradient with respect to changes in the DFH of the magnetic head.

7. The magnetic disk drive of claim 6, wherein servo synchronization marks are arranged on the magnetic disk, and first and second timestamps each represent a time period the magnetic head takes to detect two of the servo synchronization marks.

8. The magnetic disk drive of claim 6, wherein the first state and the second state are temporally continuous.

* * * * *